United States Patent [19]
Moe

[11] Patent Number: 5,163,604
[45] Date of Patent: Nov. 17, 1992

[54] METHOD FOR FORGE WELDING OR THE LIKE

[76] Inventor: Per H. Moe, Amtmann Bangsgate 7, Drammen, Norway, 3000

[21] Appl. No.: 721,599
[22] PCT Filed: Feb. 1, 1990
[86] PCT No.: PCT/NO90/00027
   § 371 Date: Jul. 26, 1991
   § 102(e) Date: Jul. 26, 1991
[87] PCT Pub. No.: WO90/08618
   PCT Pub. Date: Aug. 9, 1990

[30] Foreign Application Priority Data
Feb. 1, 1989 [NO] Norway ................... 890419

[51] Int. Cl.$^5$ ................. B23K 20/24; B23K 20/14
[52] U.S. Cl. ................. 228/173.2; 228/173.3; 228/193; 228/220; 228/265; 428/940
[58] Field of Search ............ 228/173.2, 173.3, 265, 228/193, 174, 220; 428/940

[56] References Cited
U.S. PATENT DOCUMENTS 3,766,633 10/1973 Lehrheuer et al. ......... 228/193 X
4,566,625 1/1986 Moe ....................... 228/193
4,964,564 10/1990 Neal et al. ............... 228/265

FOREIGN PATENT DOCUMENTS 554635 7/1943 United Kingdom ............ 228/173.3

Primary Examiner—Kenneth J. Ramsey
Attorney, Agent, or Firm—Darby & Darby

[57] ABSTRACT

A method for forge welding or the like of a first and a second metal part, wherein at least one joint is established between opposed bounding surfaces on the two parts to be joined, and wherein preferably a reducing gas is passed through the joint or joints before the parts are pressed together. In order to make the weld less sensitive to remaining oxides, the bounding surfaces are provided with generally matching corrugations of somewhat different height.

20 Claims, 1 Drawing Sheet

METHOD FOR FORGE WELDING OR THE LIKE

BACKGROUND OF THE INVENTION

The present invention relates to a method for forge welding or the like of a first and a second metal part, wherein at least one joint is established between opposed bounding surfaces on the two parts to be joined, and wherein preferably a reducing gas is passed through the joint or joints before the parts are pressed together.

Such a method is known e.g. from the Applicant's U.S. Pat. Nos. 4,566,625 and 4,669,650, which hereby are incorporated by reference. In the known method a reduced cross-section of the parts to be joined is used in the joint area between the parts in order to obtain a triaxial stress condition during the welding. This results in a pressure in the joint area which is several times higher than the uniaxial yield stress of the material at the temperature in question, with a consequential quicker and better diffusion.

It has now surprisingly been found that an equally good triaxial and pore closing forge welding operation may be performed in a new and simplified manner particularly suited for non-rotation symmetrical joint surfaces.

BRIEF DESCRIPTION OF THE INVENTION

This is obtained according to the invention by a method of the type mentioned by way of introduction, the method being characterized in that the bounding surfaces are provided with generally matching corrugations, which matching corrugations are given a somewhat different height.

The use of this joint form provides a number of advantages. For instance, better material properties in the weld are obtained, and testing methods provide more reliable results for the material properties. The form of the joint is simplified, i.e. it becomes simpler to make because oxy/plasma cutting may be used for large joint surfaces instead of turning/milling. Furthermore, the joint becomes better self-centering properties and, besides, one can obtain a triaxial stress condition by forging sections which are not round or axisymmetrical. A further advantage is that the finished weld becomes a better appearance since a smaller upset length is required during the pressing together of the parts. This also results in less danger of buckling during the pressing together.

A major advantage of the method according to the invention is that it enables the use of forge welding regardless of the dimension and form of the cross-section. In the above mentioned patents of the Applicant the subject is welding of pipes and bolts. The form of the joint described therein satisfies all conditions for triaxiality in order to close pores in an efficient manner. Furthermore, it is described how surface oxides may be removed by means of a reducing gas.

In the present invention one can permit a larger unreduced layer of oxides since a fracture caused by fatigue, impact or bending stress will run through the base material and only cross the weld at an acute angle at some places. The form of the objects to be welded are of less importance, and the heating zone becomes simpler to establish because the distance between the joint surfaces is less.

Practical experience has shown that the joint form used in the present invention results in better Sharpy V-notch values than the earlier joint when oxides difficult to reduce are present after welding, e.e. $SiO_2$, $TiO_2$, $Al_2O_3$ and to a certain extent $MnO_2$.

Further advantageous features of the invention are given in the dependent claims.

BRIEF DESCRIPTION OF THE DRAWINGS

For better understanding of the invention it will be explained more closely with reference to the exemplifying embodiment shown schematically in the appended drawing.

Figure 1:
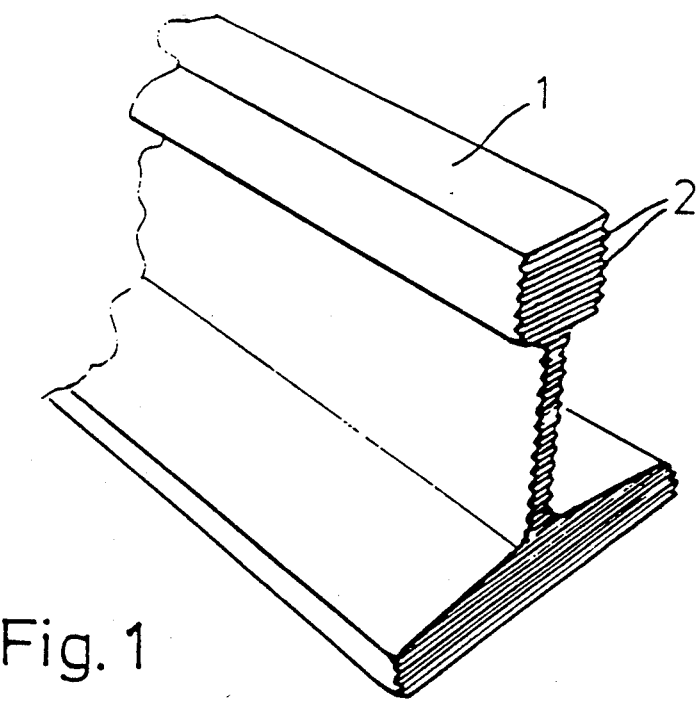
FIG. 1 shows perspectively a portion of a rail, the end surface of which is shaped in accordance with the present invention.

It is first referred to FIG. 1, where the end portion of a rail 1 is shown. The end surface of the rail is treated in accordance with the present method, i.e. it is provided with corrugations 2, which in this case are all alike and placed at evenly spaced intervals.

Figure 2:
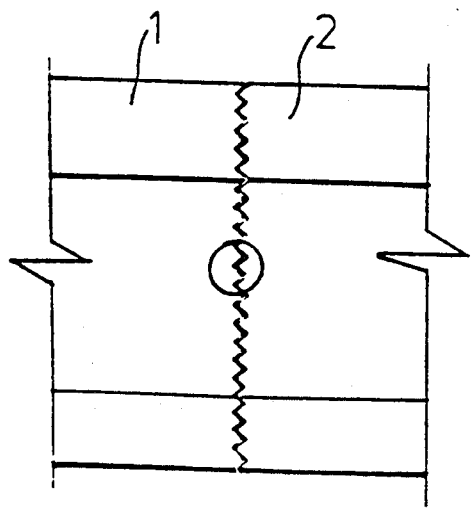
FIG. 2 shows a side view of the end portions of two rails shaped in accordance with the invention before being welded together.
Figure 3:
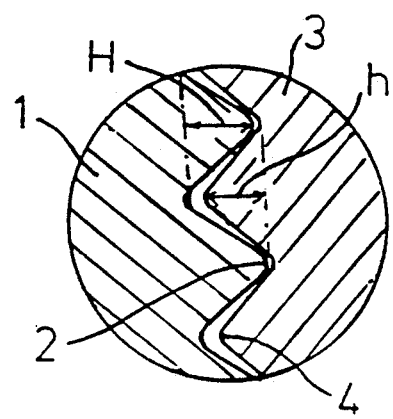
FIG. 3 shows at a larger scale a vertical section through the circled portion in FIG. 2.

In FIG. 2 the rail 1 is shown placed adjacent to a second rail 3 provided with corresponding corrugations. FIG. 3 shows the corrugations at a larger scale, the corrugations of the second rail 3 being designated 4.

The height of the corrugations 3 and 4 is designated H and h, respectively, and it can be seen that the height difference H minus h is approximately 0.15 H. This difference should lie in the range of 0.05 H to 0.25 H.

The magnitude of the height H may in the case shown be about 3 mm. For most applications this height should be larger than 1 mm and preferably lie in the range of 2-10 mm. However, in special applications, e.g. welding of turbine blades, a height less than 1 mm may be used.

Furthermore, from the Figures it may be seen that all the corrugations 2 on the rail 1 have a larger height than the corrugations 4 on the rail 2. This will of course facilitate making of the corrugations, but there is no reason why the corrugations on a particular part may vary in height, as long as this height is different from the height of the corresponding corrugations on the other part to be included in the joint.

It will be understood that if desirable, quite small corrugation heights may be used. By means of a cutting tool made by erosion it is possible to machine pipes and other sections with an accuracy of $2\mu$. Fixation of work pieces like large pipes and rails may be performed with an accuracy of 0.2 mm. The form of the corrugations make the work pieces self-centering and has an accuracy of $\pm 0.02$ mm. With such a good control over the joint form and the self-centering the forge or upset length is reduced, means being currently available for controlling this length with an accuracy of $\pm 0.1$ mm. For work pieces of a height of 200 mm one may therefore e.g. have 50 corrugations and use an upset length of 1-2 mm and still obtain correct triaxial forge conditions. When welding large pipes, e.g. with a pipe diameter of 1 m and a wall thickness of 25 mm, one can provide the pipe ends with five concentric grooves and thus obtain very good self-centering and upset conditions. For sections like e.g. rails one may use a plasma cutter in order to obtain the optimum shape of the corrugations. As regards rotation symmetrical work pieces like pipes and bolts, the desired accuracy may be obtained by means of usual machining.

From the Figures it may be seen that the corrugations in the embodiment shown has a generally triangular cross-section. The apex angle of the corrugations 2 on the rail 1 is somewhat less than 75°, while the apex angle of the corrugations 4 on the rail 3 is about 90°. The difference between these angles should lie in the range of 10°–40° and preferably be about 20°. With corrugations of such a shape the forge welding may be performed with an upset length of about twice the height difference between the corrugations.

Even though the invention has been described above with reference to a specific exemplifying embodiment, it will be understood that the invention is not limited thereto but may be modified and varied in a number of ways within the scope of the following claims.

I claim:

1. A method for forge welding comprising the steps of:
   providing a fist and a second metal part to be welded,
   forming with matching corrugations whose sides are of unequal height on the two parts to be joined,
   passing a reducing gas through the joint; and pressing the parts together.

2. A method according to claim 1, wherein the forming step comprises making all corrugations on one of the bounding surfaces of somewhat larger height than the corrugations on the other.

3. A method according to claim 2, wherein the forming step comprises making the corrugations with a height greater than 1 mm.

4. A method according to claim 3, wherein the forming step comprises making the corrugations with a height in the range of 2–10 mm.

5. A method according to claim 2, wherein the forming step comprises making said matching corrugations with a height difference which is 5%–25% of the height of the corrugations.

6. A method according to claim 2, wherein the forming step comprises making the corrugations with a generally triangular cross-section, the apex angles of matching corrugations having a difference of 10°–40°.

7. A method according to claim 2, wherein that during the forge welding the parts are pressed together a distance approximately equal to twice said difference in height.

8. A method according to claim 1, wherein the forming step comprises making the corrugations with a height which is larger than 1 mm.

9. A method according to claim 8, wherein the forming step comprises making the corrugations with a height in the range of 2–10 mm.

10. A method according to claim 8, wherein the forming step comprises making the corrugations with a generally triangular cross-section, the apex angles of matching corrugations having a difference of 10°–40°.

11. The method according to claim 7, including forming said apex angles to have a difference of about 20°.

12. A method according to claim 1, wherein the forming step comprises making the bounding surface of at least one of parts circular cylindrical, and forming the corrugations as concentric ridges and grooves, respectively.

13. A method according to claim 12, wherein the forming step comprises making said matching corrugations with a height difference which is 5%–25% of the height of the corrugations.

14. A method according to claim 12, wherein that during the forge welding the parts are pressed together a distance approximately equal to twice said difference in height.

15. A method according to claim 1, where the forming step comprises making said matching corrugations with a height difference which is 5%–25% of the height of the corrugations.

16. A method according to claim 1, wherein the forming step comprises making the corrugations with a generally triangular cross-section, the apex angles of matching corrugations having a difference of 10°–40°.

17. A method according to claim 16, wherein that during the forge welding the parts are pressed together a distance approximately equal to twice said difference in height.

18. The method according to claim 16, including forming said apex angles to have a difference of about 20°.

19. A method according to claim 1, characterized in that during the forge welding the parts are pressed together a distance approximately equal to twice said difference in height.

20. An object being constituted by at least two parts which are welded together by means of a method according to any one of the preceding claims.

* * * * *